United States Patent
Yamamoto et al.

(10) Patent No.: US 10,632,516 B2
(45) Date of Patent: Apr. 28, 2020

(54) JOINT COMPONENT MANUFACTURING METHOD

(71) Applicant: Kabushiki Kaisha F.C.C., Shizuoka (JP)

(72) Inventors: Hiroshi Yamamoto, Shizuoka (JP); Tsuyoshi Kise, Shizuoka (JP); Hiroyuki Matsuno, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 16/342,401

(22) PCT Filed: Oct. 20, 2016

(86) PCT No.: PCT/JP2016/081076
§ 371 (c)(1),
(2) Date: Apr. 16, 2019

(87) PCT Pub. No.: WO2018/073932
PCT Pub. Date: Apr. 26, 2018

(65) Prior Publication Data
US 2019/0247909 A1  Aug. 15, 2019

(30) Foreign Application Priority Data

Oct. 18, 2016 (JP) .................. 2016-204275

(51) Int. Cl.
*B21D 39/03* (2006.01)
*B23K 11/02* (2006.01)
(Continued)

(52) U.S. Cl.
CPC .......... *B21D 39/037* (2013.01); *B21D 39/00* (2013.01); *B23K 11/02* (2013.01); *B23K 20/00* (2013.01);
(Continued)

(58) Field of Classification Search
CPC ......... B23K 11/02; B23K 20/02; F16B 4/004; F16B 9/00
(Continued)

(56) References Cited

U.S. PATENT DOCUMENTS 5,519,182 A   5/1996  Linzell
6,339,868 B1  1/2002  Nagaya et al.
(Continued)

FOREIGN PATENT DOCUMENTS

JP   55-107161 A2   8/1980
JP   60-167229 U    11/1985
(Continued)

OTHER PUBLICATIONS

International Search Report (ISR) dated Nov. 22, 2016 filed in PCT/JP2016/081076.
(Continued)

*Primary Examiner* — Thien S Tran
(74) *Attorney, Agent, or Firm* — Rankin, Hill & Clark LLP

(57) ABSTRACT

Provided is a joint component manufacturing method for reducing occurrence of burrs upon bonding between a first member having a hole and a second member having a shaft portion and firmly bonding both members. In the method for manufacturing a joint component 100, a hole-side weak press-fit portion 112 is formed at a hole 111 of a flat plate ring-shaped first member 110. Moreover, each of a shaft-side weak press-fit portion 122 and a shaft-side strong press-fit portion 124 is formed at a shaft portion 121 of a cylindrical second member 120. The hole-side weak press-fit portion 112 and the shaft-side weak press-fit portion 122 are defined by a first weak press-fit interference $Lw1$ formed thinner than a first strong press-fit interference $Ls1$. The shaft-side strong press-fit portion 124 is defined by a first strong (Continued)

press-fit interference Ls1 as the minimum necessary press-fit interference for electric resistance welding upon electric resistance welding between the hole 111 and the shaft portion 121.

8 Claims, 10 Drawing Sheets

(51) Int. Cl.
  *B23P 11/02*   (2006.01)
  *F16B 4/00*    (2006.01)
  *F16B 9/00*    (2006.01)
  *B23K 20/02*   (2006.01)
  *F16B 7/20*    (2006.01)
  *B23K 20/00*   (2006.01)
  *B21D 39/00*   (2006.01)

(52) U.S. Cl.
  CPC .............. *B23K 20/02* (2013.01); *B23P 11/02* (2013.01); *F16B 4/00* (2013.01); *F16B 4/004* (2013.01); *F16B 7/20* (2013.01); *F16B 9/00* (2013.01)

(58) Field of Classification Search
  USPC ................ 219/59.1, 78.02, 93; 228/132, 135
  See application file for complete search history.

(56) References Cited

U.S. PATENT DOCUMENTS

| | | | |
|---|---|---|---|
| 2005/0127044 A1* | 6/2005 | Nozue | ................... B23K 11/02 219/78.02 |
| 2012/0282018 A1 | 11/2012 | Hardtle | |

FOREIGN PATENT DOCUMENTS

| | | | |
|---|---|---|---|
| JP | 2000-176744 A | | 6/2000 |
| JP | 2003-127032 A | | 5/2003 |
| JP | 2005-014064 A | | 1/2005 |
| JP | 2011-133073 A | | 7/2011 |
| JP | 2011133073 A | * | 7/2011 |
| WO | 2006/033316 A1 | | 3/2006 |

OTHER PUBLICATIONS

Japanese Notification of Reasons for Refusal (JPOA) dated Nov. 16, 2016 for the corresponding Japanese Patent Application No. 2016-204275.

Japanese Decision to Grant a Patent dated Feb. 7, 2017 for the corresponding Japanese Patent Application No. 2016-204275.

* cited by examiner (A)

(B)

JOINT COMPONENT MANUFACTURING METHOD

TECHNICAL FIELD

The present invention relates to a joint component manufacturing method for joining a first member and a second member by fitting of a shaft portion of the second member in a hole of the first member.

BACKGROUND ART

Typically, there has been a joint component manufacturing method for joining a first member and a second member by fitting of a shaft portion of the second member in a hole of the first member. For example, in a press-fit bonding structure disclosed in Patent Literature 1 below, a burr housing portion configured to house burrs generated upon press-fitting is formed in the vicinity of an end portion of a bonding interface at which a hole of a first member and a shaft portion of a second member are fitted to each other.

CITATION LIST

Patent Literature

PATENT LITERATURE 1: JP-A-2005-14064

SUMMARY OF THE INVENTION

However, in the press-fit bonding structure described in Patent Literature 1 above, the burr housing portion is formed continuously to the bonding interface at which the hole of the first member and the shaft portion of the second member are fitted to each other. Thus, there are problems that bonding force between the first member and the second member is weakened and such bonding force is further decreased due to a clearance in the burr housing portion in a case where the amount of burrs entering the burr housing portion is small.

The present invention has been made for coping with the above-described problems. An object of the present invention is to provide the following joint component manufacturing method. In the manufacturing method, occurrence of burrs upon bonding between a first member having a hole and a second member having a shaft portion can be reduced while both members can be firmly bonded to each other.

In order to achieve the above-described object, an aspect of the present invention is a joint component manufacturing method for joining a first member and a second member by fitting of a shaft portion of the second member in a hole of the first member, the first member and the second member each including weak press-fit portions with a first weak press-fit interference at tip end portions first fitted to each other upon fitting between the hole and the shaft portion, and the first member or the second member including a strong press-fit portion protruding with respect to the weak press-fit portions and having a thicker first strong press-fit interference than the first weak press-fit interference on a far side of the weak press-fit portions. The method includes: a first weak press-fit step of press-fitting the weak press-fit portions of the first member and the second member to each other; and a first strong press-fit step of press-fitting one of the weak press-fit portions of the first member and the second member and the strong press-fit portion to each other in a state in which electric resistance heat is generated between the first member and the second member by applying a current.

Further, in order to achieve the above-described object, another aspect of the present invention is a joint component manufacturing method for joining a first member and a second member by fitting of a shaft portion of the second member in a hole of the first member, the first member and the second member each including, at tip end portions first fitted to each other upon fitting between the hole and the shaft portion, weak press-fit portions not contacting each other at the tip end portions and having a second weak press-fit interference with respect to each strong press-fit portion formed to protrude to a far side of each tip end portion and each strong press-fit portion having a thicker second strong press-fit interference than the second weak press-fit interference. The method includes: a second weak press-fit step of press-fitting each weak press-fit portion and each strong press-fit portion of the first member and the second member to each other; and a second strong press-fit step of press-fitting the strong press-fit portions of the first member and the second member to each other in a state in which electric resistance heat is generated between the first member and the second member by applying a current.

According to each aspect of the present invention configured as described above, in the joint component manufacturing method, the hole of the first member and the shaft portion of the second member are bonded to each other by press-fitting with the first strong press-fit interference and the second strong press-fit interference through press-fitting with the first weak press-fit interference and the second weak press-fit interference. In this case, the first weak press-fit interference and the second weak press-fit interference are, with respect to the first strong press-fit interference and the second strong press-fit interference, formed such that an overlapping thickness (i.e., the press-fit interference) between both members is decreased. Thus, according to the joint component manufacturing method of the present invention, occurrence of burrs upon bonding between the first member having the hole and the second member having the shaft portion can be reduced while close contact between both members without any clearances and firm bonding between both members can be realized.

According to other aspect of the present invention, in the joint component manufacturing method, the first weak press-fit interference and the second weak press-fit interference are formed to such an overlapping thickness that no burrs are generated between the first member and the second member fitted to each other.

According to the other aspect of the present invention configured as described above, in the joint component manufacturing method, the first weak press-fit interference and the second weak press-fit interference are formed to such a thickness that no burrs are generated between the first member and the second member fitted to each other. Thus, occurrence of burrs upon bonding between the first member having the hole and the second member having the shaft portion can be more effectively reduced. In this case, the first weak press-fit interference and the second weak press-fit interference are set for each of the materials, shapes, and press-fit conditions of the first member and the second member, and therefore, are obtained by experiment in advance. Note that a burr is one generated when part of the material forming the hole and/or the shaft portion is carved or extruded to the periphery of an opening of the hole upon fitting between the hole and the shaft portion in a press-fit state.

According to other aspect of the present invention, in the joint component manufacturing method, a guide portion having an inclined surface or a curved surface is formed at at least one corner portion of the tip end portions first fitted to each other upon fitting between the hole and the shaft portion.

According to the other aspect of the present invention configured as described above, the guide portion having the inclined surface or the curved surface is formed at at least one corner portion of the tip end portions first fitted to each other upon fitting between the hole and the shaft portion. Thus, the shaft portion of the second member is smoothly guided to the hole of the first member, and is easily fitted in the hole. Thus, occurrence of burrs can be more effectively reduced.

According to other aspect of the present invention, in the joint component manufacturing method, the weak press-fit portion has a gradually-changing portion of which the shape gradually changes with respect to the strong press-fit portion.

According to the other aspect of the present invention configured as described above, in the joint component manufacturing method, the weak press-fit portion has the gradually-changing portion of which the shape gradually changes with respect to the strong press-fit portion. Thus, the shaft portion of the second member is smoothly guided to the hole of the first member, and is easily fitted in the hole. Thus, occurrence of burrs can be more effectively reduced.

According to other aspect of the present invention, in the joint component manufacturing method, at least one of the first member and the second member is, at the first weak press-fit step and the second weak press-fit step, supported in a displaceable state in a direction perpendicular to a fitting direction.

According to the other aspect of the present invention configured as described above, in the joint component manufacturing method, at least one of the first member and the second member is, at the first weak press-fit step and the second weak press-fit step, supported in the displaceable state in the direction perpendicular to the fitting direction. Thus, even in a case where misalignment between the hole of the first member and the shaft portion of the second member has occurred, the first member and/or the second member are, at the first weak press-fit step and the second weak press-fit step, moved to perform fitting with the centers of both members being coincident with each other. With this configuration, according to the joint component manufacturing method of the present invention, the first member and the second member can be bonded to each other with the cores of the first member and the second member being coincident with each other even in a case where the cores are shifted from each other upon bonding between both members.

DESCRIPTION OF THE EMBODIMENTS

First Embodiment

Figure 1:
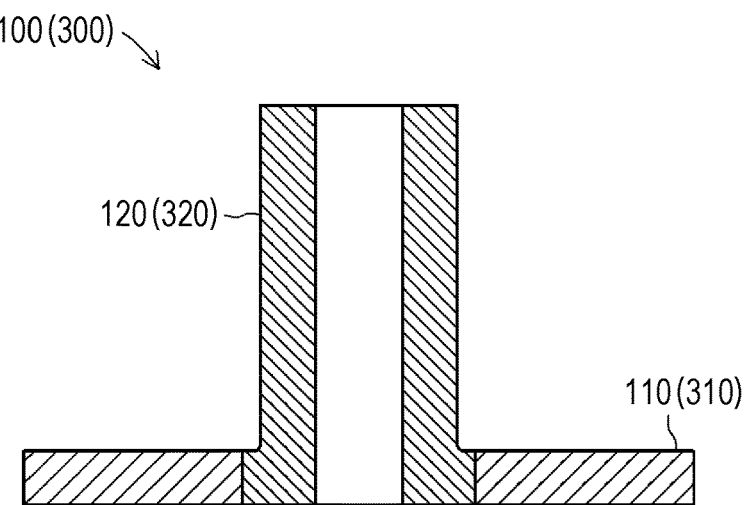
FIG. 1 is a schematic sectional view of an outline configuration of a joint component formed by a joint component manufacturing method according to the present invention.
Figure 2:
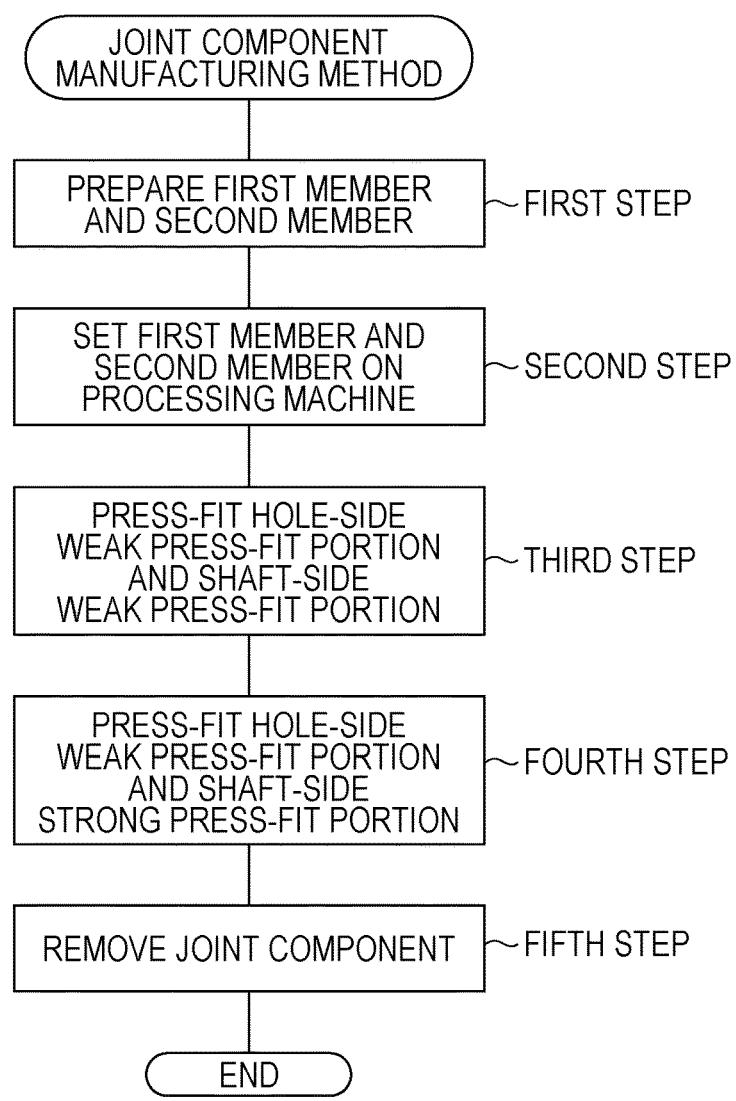
FIG. 2 is a flowchart of processing steps of a joint component manufacturing method according to a first embodiment of the present invention.

Hereinafter, a first embodiment of a joint component manufacturing method according to the present invention will be described with reference to the drawings. FIG. 1 is a schematic sectional view of an outline configuration of a joint component 100 formed by the joint component manufacturing method according to the present invention. Moreover, FIG. 2 is a flowchart of the flow of main steps in the method for manufacturing the joint component 100 according to the first embodiment of the present invention. Note that for the sake of easy understanding of the present invention, each figure referred in the present specification is schematically illustrated, and for example, some components are exaggeratingly illustrated. Thus, the dimensions and ratio of each component may be changed.

First, the joint component 100 formed by the joint component manufacturing method according to the present invention will be briefly described. The joint component 100 mainly includes a first member 110 obtained in such a manner that a steel member is formed in a flat plate ring shape, and a second member 120 obtained in such a manner that a steel member is formed in a cylindrical shape. A though-hole-shaped hole 111 to which the second member 120 is bonded with the second member 120 being fitted in the hole 111 is formed at a center portion of a flat plate ring body of the first member 110. Moreover, a cylindrical shaft portion 121 bonded with the shaft portion 121 being fitted in the hole 111 of the first member 110 is formed on one end side (the lower side as viewed in the figure) of a cylindrical body of the second member 120. The first member 110 and the second member 120 are, at the hole 111 and the shaft portion 121, bonded to each other by electric resistance welding to integrally form the joint component 100.

The joint component 100 includes, for example, a component forming a power transmission device such as a clutch or a transmission in a self-propelled vehicle, the component including, for example, a pulley in a centrifugal clutch, an interlock sleeve in a manual transmission, or a manual plate in an automatic transmission.

Figure 3:
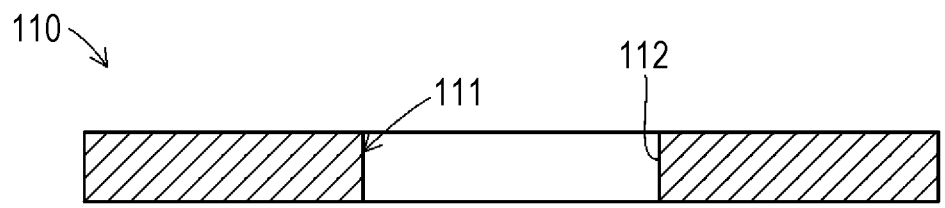
FIGS. 3(A) and 3(B) each schematically illustrate a first member and a second member used in the first embodiment of the present invention, (A) being a front sectional view of the first member and (B) being a front sectional view of the second member.
Figure 3:
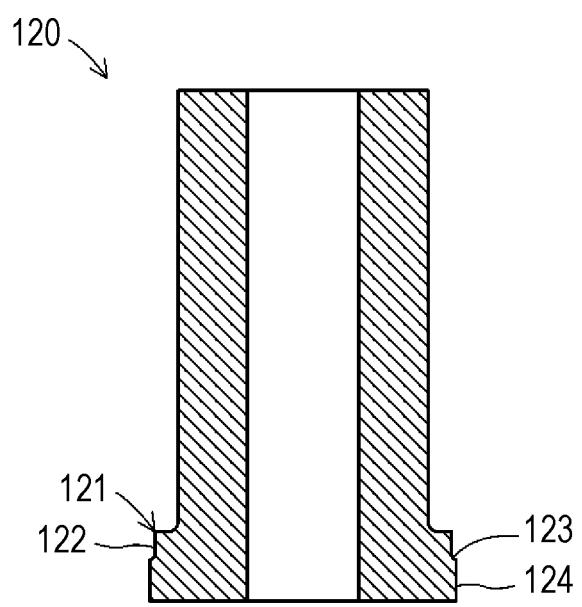

First, a worker manufacturing the joint component 100 prepares, as a first step, each of the first member 110 and the second member 120 as materials of the joint component 100, as illustrated in FIG. 3 (a) and FIG. 3 (b). The first member 110 and the second member 120 are formed by punching using a press, bending using a press, or mechanical processing such as cutting. In this case, a hole-side weak press-fit portion 112 and a shaft-side weak press-fit portion 122 are each formed at a bonding portion between the first member 110 and the second member 120, i.e., the hole 111 and the shaft portion 121.

Figure 4:
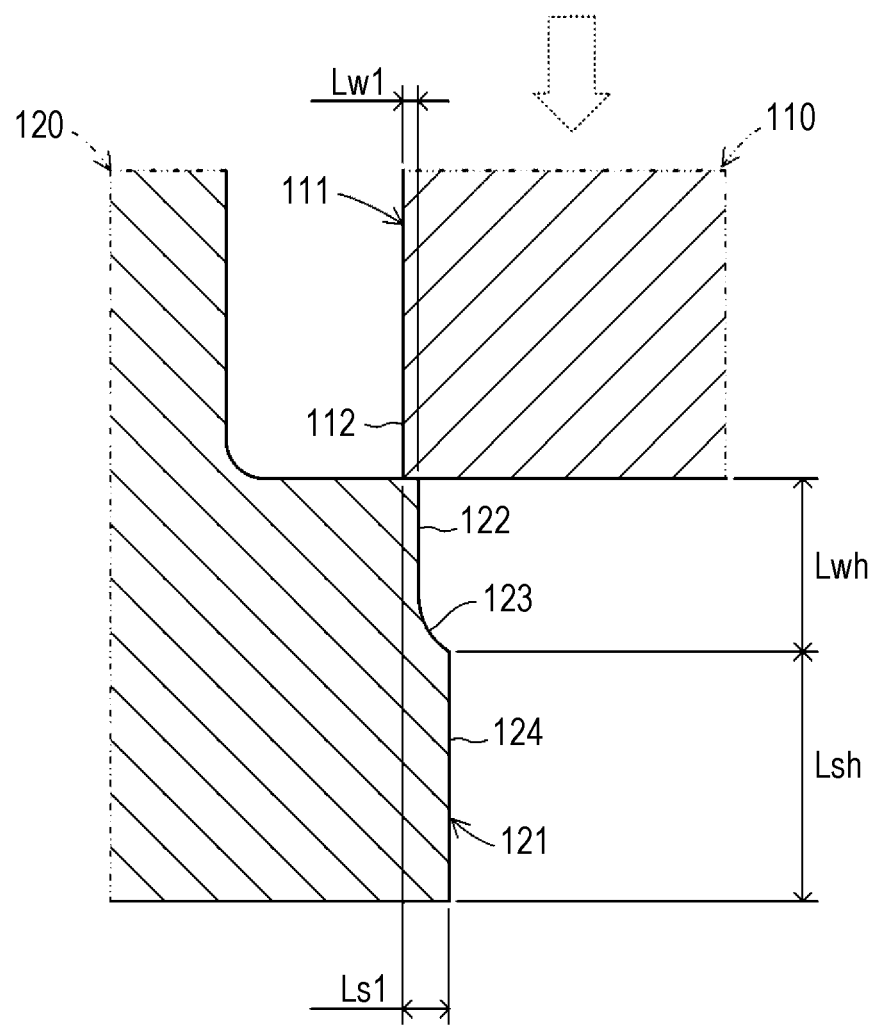
FIG. 4 is a schematic sectional view of a main portion for describing a main portion configuration in a state in which the first member is arranged on the second member at one step of the joint component manufacturing method according to the first embodiment of the present invention.

As illustrated in FIG. 4, the hole-side weak press-fit portion 112 and the shaft-side weak press-fit portion 122 are portions formed with a first weak press-fit interference Lw1 as a predetermined press-fit interference at fitting tip end portions as tip end portions first fitted to each other when the shaft portion 121 of the second member 120 is fitted in the hole 111 of the first member 110. The first weak press-fit interference Lw1 is the thickness of an overlapping portion upon fitting between the hole-side weak press-fit portion 112 and the shaft-side weak press-fit portion 122. The first weak press-fit interference Lw1 is formed smaller (thinner) than a later-described first strong press-fit interference Ls1.

More specifically, the first weak press-fit interference Lw1 is set to such a size that the amount of burrs generated when the shaft-side weak press-fit portion 122 of the shaft portion 121 is press-fitted in the hole-side weak press-fit portion 112 of the hole 111 is less than the amount of burrs generated when at least a later-described shaft-side strong press-fit portion 124 is press-fitted in the hole-side weak press-fit portion 112. The first weak press-fit interference Lw1 is set for each of the materials, shapes, and press-fit conditions of the first member 110 and the second member 120, and therefore, is experimentally obtained in advance.

In the present embodiment, the first weak press-fit interference Lw1 is set to such a size that no burrs due to radial compression and deformation of at least one of the hole-side weak press-fit portion 112 or the shaft-side weak press-fit portion 122 are generated when the shaft-side weak press-fit portion 122 is press-fitted in the hole-side weak press-fit portion 112. Note that according to experiment by the present inventor et al., the first weak press-fit interference Lw1 preferably has a diameter of greater than 0 mm and equal to or less than 0.1 mm in a case where the diameter of each of the hole 111 and the shaft portion 121 formed of the steel members is within a range of 10 mm to 100 mm in terms of diameter.

The first weak press-fit interference Lw1 is defined by the minus tolerance of the hole 111 with respect to a reference inner diameter dimension of the hole-side weak press-fit portion 112 and the plus tolerance of the shaft portion 121 with respect to a reference outer diameter dimension of the shaft-side weak press-fit portion 122. That is, the first weak press-fit interference Lw1 is defined by interference fit between the hole 111 and the shaft portion 121. The formation length Lwh of the shaft-side weak press-fit portion 122 on a side provided with the shaft-side strong press-fit portion 124 among the hole-side weak press-fit portion 112 and the shaft-side weak press-fit portion 122 is set in a relationship with the formation length Lsh of the shaft-side strong press-fit portion 124. That is, the formation length Lwh of the shaft-side weak press-fit portion 122 is a portion for reducing the burr generation amount due to fitting between the hole 111 and the shaft portion 121. On the other hand, the formation length Lsh of the shaft-side strong press-fit portion 124 is a portion defining bonding force between the hole 111 and the shaft portion 121.

Thus, the formation length Lwh of the shaft-side weak press-fit portion 122 is set according to the bonding force between the hole 111 and the shaft portion 121, the bonding force being necessary for the joint component 100. According to the experiment by the present inventor et al., the formation length Lwh of the shaft-side weak press-fit portion 122 may be preferably equal to or less than the half of the formation length Lsh of the shaft-side strong press-fit portion 124, and more preferably equal to or less than ⅓ of the formation length Lsh of the shaft-side strong press-fit portion 124. In the present embodiment, the formation length Lwh of the shaft-side weak press-fit portion 122 is formed equal to or less than ⅓ of the formation length Lsh of the shaft-side strong press-fit portion 124.

The lower limit of the formation length Lwh of the shaft-side weak press-fit portion 122 is set to such a length that the hole-side weak press-fit portion 112 and the shaft-side weak press-fit portion 122 evenly contact each other in a cylindrical surface shape and smooth electrical conduction between both portions is allowed. According to the experiment by the present inventor et al., the lower limit of the formation length Lwh of the shaft-side weak press-fit portion 122 may be equal to or greater than ⅕ of the thickness ST of a bonding portion between the hole 111 and the shaft portion 121, and more preferably equal to or less than ¼ of such a bonding portion.

On the other hand, the formation length Lwh of the hole-side weak press-fit portion 112 not provided with the shaft-side strong press-fit portion 124 in the hole 111 is formed with a thickness of equal to or greater than the thickness ST in bonding between the hole 111 and the shaft portion 121. In the present embodiment, the thickness ST in bonding between the hole 111 and the shaft portion 121 is the same as the thickness of the first member 110, and therefore, the formation length Lwh of the hole-side weak press-fit portion 112 is formed with the same length as the thickness of the first member 110, i.e., is formed across the entirety of the hole 111.

A gradually-changing portion 123 is formed at a far-side back end portion (the lower side as viewed in the figure) of the shaft-side weak press-fit portion 122. The gradually-changing portion 123 is a portion of which the shape gradually changes between the shaft-side weak press-fit portion 122 and the shaft-side strong press-fit portion 124. In the present embodiment, the gradually-changing portion 123 is formed such that the shaft-side weak press-fit portion 122 and the shaft-side strong press-fit portion 124 are connected by an arc-shaped curved surface. The shaft-side strong press-fit portion 124 is formed on a far side (the lower side as viewed in the figure) of the gradually-changing portion 123.

The shaft-side strong press-fit portion 124 is a portion formed with the first strong press-fit interference Ls1 as a predetermined press-fit interference from the hole-side weak press-fit portion 112. The first strong press-fit interference Ls1 is the thickness of an overlapping portion upon fitting between the shaft-side strong press-fit portion 124 and the hole-side weak press-fit portion 112. The first strong press-fit interference Ls1 is formed greater (thicker) than the first weak press-fit interference Lw1. More specifically, the first strong press-fit interference Ls1 is set such that the minimum necessary press-fit interference for electric resistance welding is ensured upon electric resistance welding between the hole 111 and the shaft portion 121.

The first strong press-fit interference Ls1 is set for each of the materials, shapes, and press-fit conditions of the first member 110 and the second member 120, and therefore, is experimentally obtained in advance. According to the experiment by the present inventor et al., the first strong press-fit interference Ls1 preferably has a diameter of 0.5 mm±0.05 mm in a case where the diameter of each of the hole 111 and the shaft portion 121 formed of the steel members is within a range of 10 mm to 100 mm in terms of diameter.

The first strong press-fit interference Ls1 is defined by the minus tolerance of the hole 111 with respect to the reference inner diameter dimension of the hole-side weak press-fit portion 112 and the plus tolerance of the shaft portion 121 with respect to the reference outer diameter dimension of the shaft-side strong press-fit portion 124. That is, the first strong press-fit interference Ls1 is defined by interference fit between the hole 111 and the shaft portion 121. Moreover, the formation length Lsh of the shaft-side strong press-fit portion 124 is set according to the bonding force between the hole 111 and the shaft portion 121, the bonding force being necessary for the joint component 100.

Figure 5:
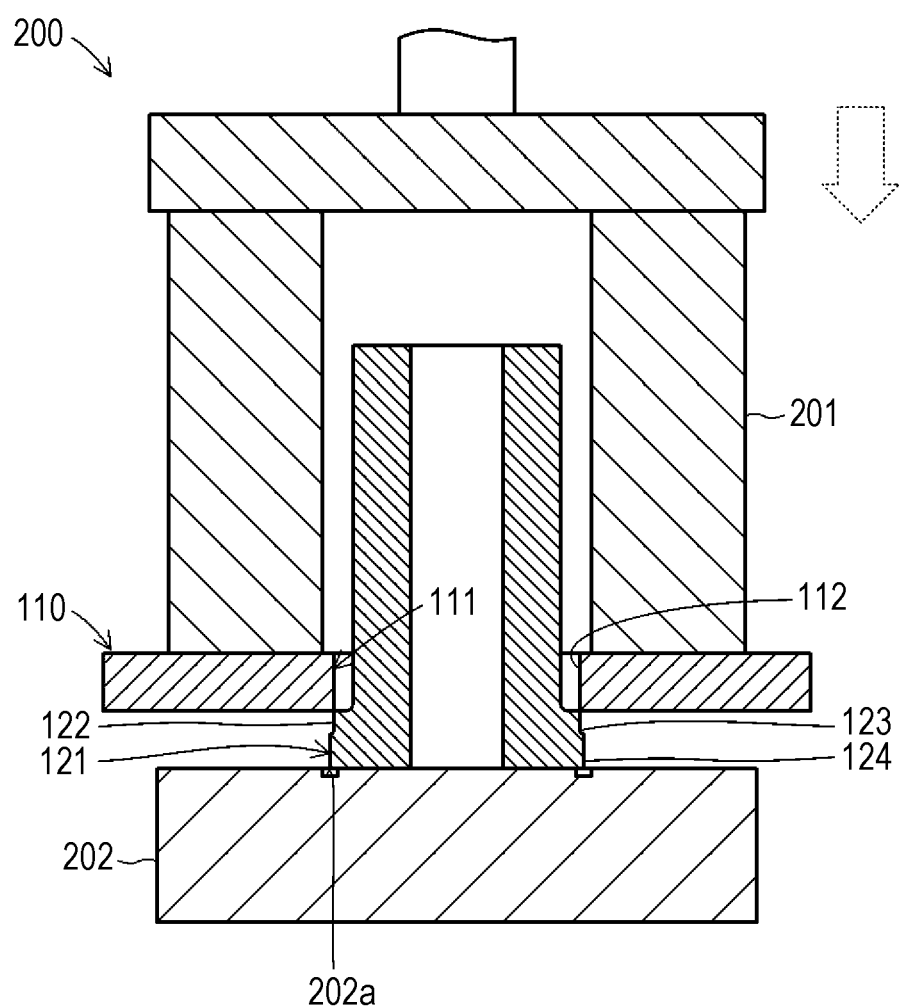
FIG. 5 is a schematic sectional view of a processing machine used for the joint component manufacturing method according to the first embodiment of the present invention in a state in which the first member and the second member are arranged on the processing machine.

Next, the worker sets, as a second step, the first member 110 and the second member 120 on a processing machine 200 configured to perform electric resistance welding. The processing machine 200 described herein is a welding device configured to generate electric resistance heat by applying a current between two members fitted to each other to press-fit these two members, thereby generating plastic flow of an interface between these members to perform solid phase bonding of the members. As illustrated in FIG. 5, the processing machine 200 mainly includes a first die 201 and a second die 202.

The first die 201 and the second die 202 are components configured to press the hole 111 of the first member 110 and the shaft portion 121 of the second member 120 in a current application state to press-fit these portions. Each of the first die 201 and the second die 202 is made of a material (e.g., chromium copper) exhibiting electric conductivity. Of these components, the first die 201 is a movable die configured to press the first member 110 arranged on the second member 120 toward the second member 120, and is formed in a cylindrical shape.

On the other hand, the second die 202 is a fixed die configured to support the second member 120, and is formed in a flat plate shape. In this case, a recessed portion 202a recessed in a ring shape is formed at a portion of a surface of the second die 202 corresponding to an outer peripheral portion of the shaft portion 121 of the second member 120. That is, the first die 201 and the second die 202 press both of the first member 110 and the second member 120 in a state in which each of the first member 110 and the second member 120 is not restricted in a direction perpendicular to a pressing direction, i.e., a radial direction of each of the first member 110 and the second member 120, and is displaceable in such a direction.

At the second step, the worker arranges the second member 120 on the second die 202. Thereafter, the worker arranges the first member 110 on the shaft portion 121 of the second member 120. In this case, for the first weak press-fit interference Lw1, the inner diameter of the hole 111 is smaller than the outer diameter of the shaft portion 121 of the second member 120. Thus, the first member 110 is placed on the shaft portion 121 of the second member 120.

Figure 6:
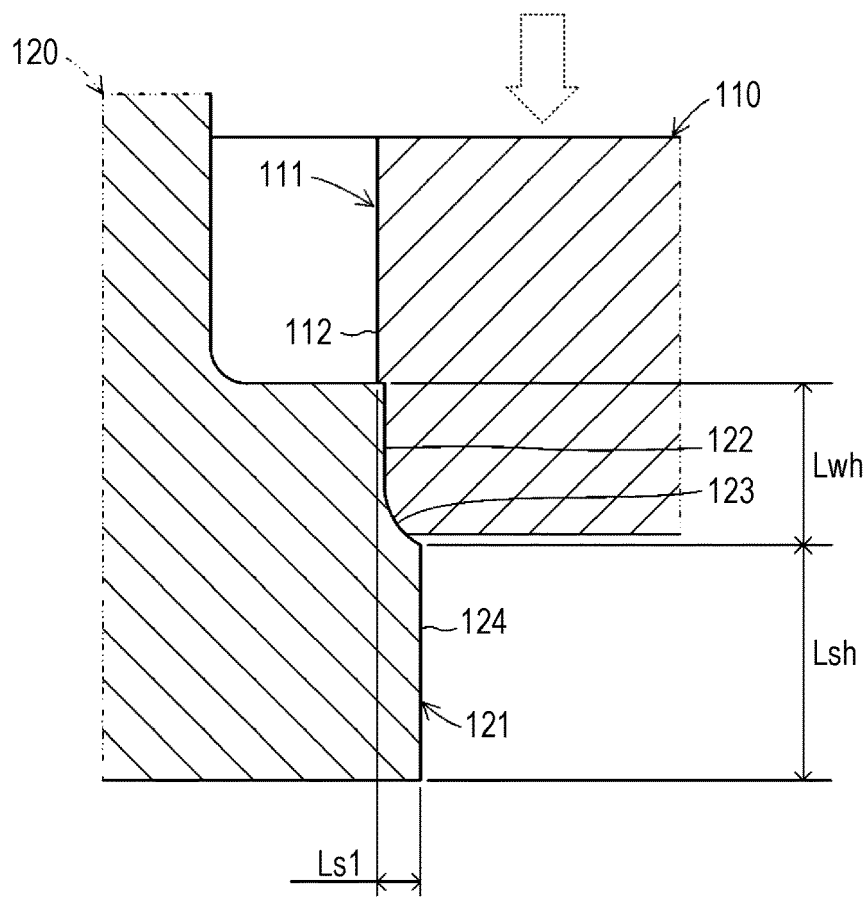
FIG. 6 is a schematic sectional view of a main portion for describing a main portion configuration in a state right after a first weak press-fit step as one step of the joint component manufacturing method according to the first embodiment of the present invention.

Next, the worker press-fits, as a third step, the hole-side weak press-fit portion 112 of the first member 110 and the shaft-side weak press-fit portion 122 of the second member 120 to each other. Specifically, the worker operates the processing machine 200 to move (move downward in a direction indicated by a dashed arrow in each of FIGS. 4 and 5) the first die 201 toward the second die 202 in a non-current-application state. Accordingly, as illustrated in FIG. 6, the hole-side weak press-fit portion 112 of the hole 111 of the first member 110 is fitted in the shaft-side weak press-fit portion 122 of the shaft portion 121 of the second member 120. In this case, for the first member 110 and the second member 120, the first weak press-fit interference Lw1 is set to such a thickness that no burrs are generated between these members, and therefore, the first member 110 and the second member 120 are fitted to each other with no burrs between these members.

Moreover, at the third step, the first die 201 and the second die 202 each press the first member 110 and the second member 120 with these members being displaceable in the radial direction. Thus, in a case where the positions of the center axes of the hole-side weak press-fit portion 112 and the shaft-side weak press-fit portion 122 are shifted from each other upon fitting therebetween, at least one of the first member 110 or the second member 120 is displaced in the radial direction such that the positions of the center axes of these portions are coincident with each other. In this manner, the first member 110 and the second member 120 are fitted to each other with the center axes being coincident with each other. The third step corresponds to a first weak press-fit step according to the present invention. That is, each of the hole-side weak press-fit portion 112 and the shaft-side weak press-fit portion 122 corresponds to a weak press-fit portion according to the present invention.

Figure 7:
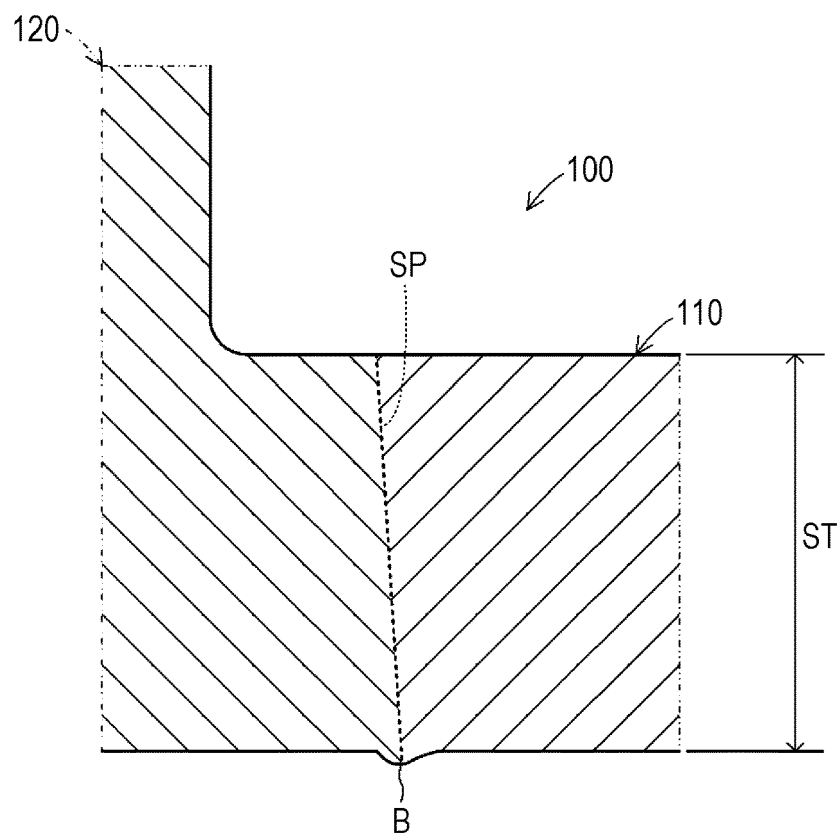
FIG. 7 is a schematic sectional view of a main portion for describing a main portion configuration in a state right after a first strong press-fit step as one step of the joint component manufacturing method according to the first embodiment of the present invention.
Figure 8:
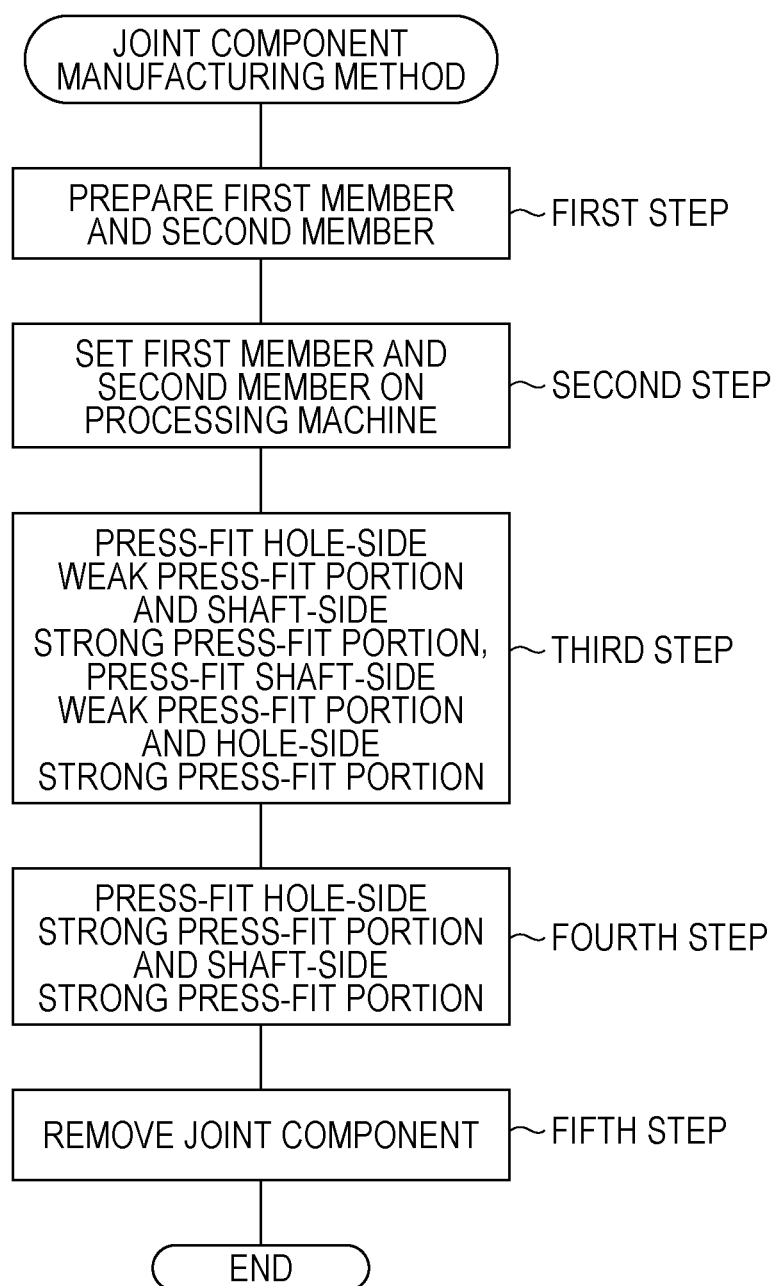
FIG. 8 is a flowchart of processing steps of a joint component manufacturing method according to a second embodiment of the present invention.

Next, the worker press-fits, as a fourth step, the hole-side weak press-fit portion 112 of the first member 110 and the shaft-side strong press-fit portion 124 of the second member 120 to each other. Specifically, the worker operates the processing machine 200 to move (move downward in a direction indicated by a dashed arrow in FIG. 6) the first die 201 toward the second die 202 in a current application state between the first die 201 and the second die 202. Thus, as illustrated in FIG. 7, the hole-side weak press-fit portion 112 of the hole 111 of the first member 110 is fitted in the shaft-side strong press-fit portion 124 through the gradually-changing portion 123 of the shaft portion 121 of the second member 120. Then, solid phase bonding between the hole-side weak press-fit portion 112 and the shaft-side strong press-fit portion 124 is made by resistance heat by applying a current and pressure due to lowering of the first die 201.

In this case, a bonding portion SP between the hole ill and the shaft portion is formed inclined from the shaft-side weak press-fit portion 122 toward the shaft-side strong press-fit portion 124. Further, a burr B clue to solid phase bonding between the hole-side weak press-fit portion 112 and the shaft-side strong press-fit portion 124 might be generated at a tip end portion of the bonding portion SP. That is, the burr B is or is not generated according to the formation length Lwh of the shaft-side weak press-fit portion 122.

At the bonding portion SP, a press-fit portion between the shaft-side weak press-fit portion 122 and part (the upper side as viewed in FIGS. 4 and 6) of the hole-side weak press-fit portion 112 is a bonding portion formed by press-fit bonding and/or solid phase bonding. A press-fit portion between the shaft-side strong press-fit portion 124 and another part (the lower side as viewed in FIGS. 4 and 6) of the hole-side weak press-fit portion 112 is a bonding portion formed by solid phase bonding. In this case, the press-fit portion between the shaft-side weak press-fit portion 122 and part of the hole-side weak press-fit portion 112 includes, according to the materials, shapes, press-fit conditions, and current application conditions of the first member 110 and the second member 120, the case of bonding only by press-fitting, the case of bonding only by solid phase bonding, and the case of bonding by a combination of press-fit bonding and solid phase bonding. Thus, according to the joint component manufacturing method of the present invention, the formation length Lwh of the shaft-side weak press-fit portion 122 and the formation length Lsh of the shaft-side strong press-fit portion 124 are adjusted as necessary so that the amount of generated burrs B and bonding strength between both members can be adjusted.

By the fourth step, the first member 110 and the second member 120 are bonded to each other to form the joint component 100. The fourth step corresponds to a first strong press-fit press step according to the present invention. That is, the shaft-side strong press-fit portion 124 corresponds to a strong press-fit portion according to the present invention.

Note that the bonding portion SP does not clearly appear, and FIG. 7 merely illustrates trend. Moreover, in the first embodiment, the worker instructs the processing machine 200 to execute each of the third and fourth steps. However, the processing machine 200 can be configured to continuously execute the third step and the fourth step by a single instruction.

Next, the worker takes, as a fifth step, the joint component 100 out of the processing machine 200. Specifically, the worker confirms, after the fourth step, that the first die 201 has been separated (has moved upward as viewed in the figure) from the second die 202 and the processing machine 200 has returned to an original position, and then, takes the joint component 100 out of the second die 202. Thereafter, the worker performs necessary processing for the joint component 100, thereby bringing the joint component 100 to completion. This post-processing for the joint component 100 does not directly relate to the present invention, and therefore, description thereof will be omitted.

As seen from operation description above, in the method for manufacturing the joint component 100, the hole 111 of the first member 110 and the shaft portion 121 of the second member 120 are, according to the first embodiment, bonded to each other by press-fitting with the first strong press-fit interference Ls1 through press-fitting with the first weak press-fit interference Lw1. In the this case, the first weak press-fit interference Lw1 is, with respect to the first strong press-fit interference Ls1, formed such that an overlapping thickness (i.e., the press-fit interference) between both members is decreased. Thus, according to the method for manufacturing the joint component 100 according to the present invention, occurrence of the burrs B in bonding between the first member 110 having the hole 111 and the second member 120 having the shaft portion 121 is reduced while close contact between both members without any clearances and firm bonding between both members can be realized.

Further, implementation of the present invention is not limited to the above-described embodiment, and various changes can be made without departing from the object of the present invention.

For example, in the above-described embodiment, the shaft-side strong press-fit portion 124 as the strong press-fit portion according to the present invention is provided at the shaft portion 121 of the second member 120. However, the strong press-fit portion may be formed at either one of the first member 110 or the second member 120. Thus, the strong press-fit portion can be formed as a hole-side strong press-fit portion at the hole 111 of the first member 110 on a far side (the upper side as viewed in FIG. 4) of the hole-side weak press-fit portion 112.

Second Embodiment

Next, a second embodiment of a joint component manufacturing method according to the present invention will be described with reference to FIGS. 8 to 11. In the second embodiment, differences from the first embodiment will be mainly described.

A joint component 300 configured in a manner similar to that of the joint component 100 mainly includes a first member 310 and a second member 320. In the first member 310, each of a hole-side weak press-fit portion 312, a gradually-changing portion 313, and a hole-side strong press-fit portion 314 is formed at a through-hole-shaped hole 311. Moreover, the second member 320 is configured such that each of a shaft-side weak press-fit portion 322, a gradually-changing portion 323, and a shaft-side strong press-fit portion 324 is formed at a cylindrical shaft portion 321.

Figure 9:
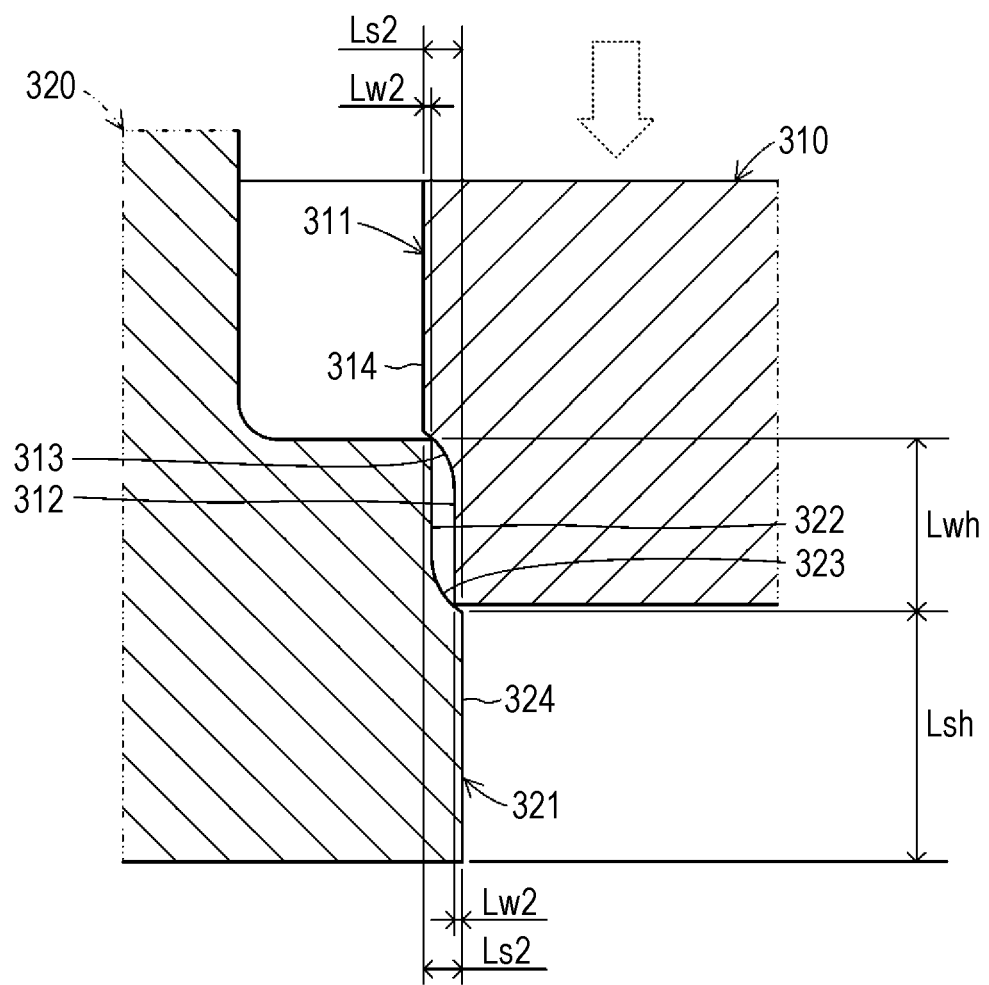
FIG. 9 is a schematic sectional view of a main portion for describing a main portion configuration in a state in which a first member is arranged on a second member at one step of the joint component manufacturing method according to the second embodiment of the present invention.

As illustrated in FIG. 9, the hole-side weak press-fit portion 312 and the shaft-side weak press-fit portion 322 are portions formed with a second weak press-fit interference Lw2 as a predetermined press-fit interference at fitting tip end portions as tip end portions first fitted to each other when the shaft portion 321 of the second member 320 is fitted in the hole 311 of the first member 310. The second weak press-fit interference Lw2 is the thickness of an overlapping portion upon fitting between the hole-side weak press-fit portion 312 and the shaft-side strong press-fit portion 324 and upon fitting between the shaft-side weak press-fit portion 322 and the hole-side strong press-fit portion 314. The second weak press-fit interference Lw2 is formed smaller (thinner) than a later-described second strong press-fit interference Ls2.

More specifically, as in the first weak press-fit interference Lw1, the second weak press-fit interference Lw2 is set to such a size that the amount of burrs generated when the shaft-side strong press-fit portion 324 is press-fitted in the hole-side weak press-fit portion 312 and when the shaft-side weak press-fit portion 322 is press-fitted in the hole-side strong press-fit portion 314 is less than the amount of burrs generated when at least the later-described shaft-side strong press-fit portion 324 is press-fitted in the hole-side strong press-fit portion 314. The second weak press-fit interference Lw2 is set for each of the materials, shapes, and press-fit conditions of the first member 310 and the second member 320, and therefore, is experimentally obtained in advance. Moreover, the same second weak press-fit interference Lw2 forming the hole-side weak press-fit portion 312 and the shaft-side weak press-fit portion 322 is applied.

In the present embodiment, the second weak press-fit interference Lw2 is, as in the first weak press-fit interference Lw1, set to such a size that no burrs are generated due to compression deformation of each portion in a radial direction when the shaft-side strong press-fit portion 324 is press-fitted in the hole-side weak press-fit portion 312 and when the shaft-side weak press-fit portion 322 is press-fitted in the hole-side strong press-fit portion 314. Note that according to experiment by the present inventor et al., the second weak press-fit interference Lw2 preferably has a diameter of greater than 0 mm and equal to or less than 0.1 mm in a case where the diameter of each of the hole 311 and the shaft portion 321 formed of steel members is within a range of 1.0 mm to 100 mm in terms of diameter.

As in the first weak press-fit interference Lw1, the second weak press-fit interference Lw2 is defined by interference fitting between the hole 311 and the shaft portion 321. Moreover, as in the formation length Lwh of the shaft-side weak press-fit portion 122, the formation length Lwh of each of the hole-side weak press-fit portion 312 and the shaft-side weak press-fit portion 322 is set in a relationship with the formation length Lsh of each of the hole-side strong press-fit portion 314 and the shaft-side strong press-fit portion 324. That is, the formation length Lwh of each of the hole-side weak press-fit portion 312 and the shaft-side weak press-fit portion 322 is a portion for reducing the amount of burrs generated due to fitting between the hole 311 and the shaft portion 321. On the other hand, the formation length Lsh of each of the hole-side strong press-fit portion 314 and the shaft-side strong press-fit portion 324 is a portion defining bonding force between the hole 311 and the shaft portion 321.

Thus, the formation length Lwh of each of the hole-side weak press-fit portion 312 and the shaft-side weak press-fit portion 322 is set according to the bonding force between the hole 311 and the shaft portion 321, the bonding force being necessary for the joint component 300. According to the experiment by the present inventor et al., the formation length Lwh of each of the hole-side weak press-fit portion 312 and the shaft-side weak press-fit portion 322 may be preferably equal to or less than the half of the formation length Lsh of each of the hole-side strong press-fit portion 314 and the shaft-side strong press-fit portion 324, and more preferably equal to or less than $1/3$ of the formation length Lsh of each of the hole-side strong press-fit portion 314 and the shaft-side strong press-fit portion 324, in the present embodiment, the formation length Lwh of each of the hole-side weak press-fit portion 312 and the shaft-side weak press-fit portion 322 is formed equal to or less than $1/3$ of the formation length Lsh of each of the hole-side strong press-fit portion 314 and the shaft-side strong press-fit portion 324.

The lower limit of the formation length Lwh of each of the hole-side weak press-fit portion 312 and the shaft-side weak press-fit portion 322 is set to such a length that the hole-side weak press-fit portion 312 and the shaft-side strong press-fit portion 324 evenly contact each other in a cylindrical surface shape, the hole-side strong press-fit portion 314 and the shaft-side weak press-fit portion 322 evenly contact each other in a cylindrical surface shape, and smooth electrical conduction between both portions is allowed. According to the experiment by the present inventor et al., the lower limit of the formation length Lwh of each of the hole-side weak press-fit portion 312 and the shaft-side weak press-fit portion 322 may be equal to or greater than $1/5$ of the thickness ST of a bonding portion between the hole 311 and the shaft portion 321, and more preferably equal to or greater than $1/4$ of such a bonding portion.

The hole-side strong press-fit portion 314 and the shaft-side strong press-fit portion 324 are portions formed with the second strong press-fit interference Ls2 as a predetermined press-fit interference between these portions. The second strong press-fit interference Ls2 is the thickness of an overlapping portion upon fitting between the hole-side strong press-fit portion 314 and the shaft-side strong press-fit portion 324. The second strong press-fit interference Ls2 is formed greater (thicker) than the second weak press-fit interference Lw2. More specifically, the second strong press-fit interference Ls2 is set such that the minimum necessary press-fit interference for electric resistance welding is ensured upon electric resistance welding between the hole 311 and the shaft portion 321.

The second strong press-fit interference Ls2 is set for each of the materials, shapes, and press-fit conditions of the first member 310 and the second member 320, and therefore, is experimentally obtained in advance. According to the experiment by the present inventor et al., the second strong press-fit interference Ls2 preferably has a diameter of 0.5 mm±0.05 mm in a case where the diameter of each of the hole 311 and the shaft portion 321 formed of the steel members is within a range of 10 mm to 100 mm in terms of diameter.

The second strong press-fit interference Ls2 is defined by interference fitting between the hole 311 and the shaft portion 321. Moreover, the formation length Lsh of each of the hole-side strong press-fit portion 314 and the shaft-side strong press-fit portion 324 is set according to the bonding force between the hole 311 and the shaft portion 321, the bonding force being necessary for the joint component 300. Moreover, the same second strong press-fit interference Ls2 forming the hole-side strong press-fit portion 314 and the shaft-side strong press-fit portion 324 is applied.

As in the first embodiment, the first member 310 and the second member 320 configured as described above are, as illustrated in FIG. 8, configured such that the second member 320 is arranged on a second die 202 through a first step and a second step. Further, the first member 310 is arranged on the second member 320. In this case, the first member 310 is formed with such a small diameter that the shaft-side weak press-fit portion 322 does not contact the hole-side weak press-fit portion 312 to ensure the second weak press-fit interference Lw2 between the shaft-side weak press-fit portion 322 and the hole-side strong press-fit portion 314. Thus, the first member 310 is arranged in a state which the hole-side weak press-fit portion 312 is fitted at a position facing the outside of the shaft-side weak press-fit portion 322.

Figure 10:
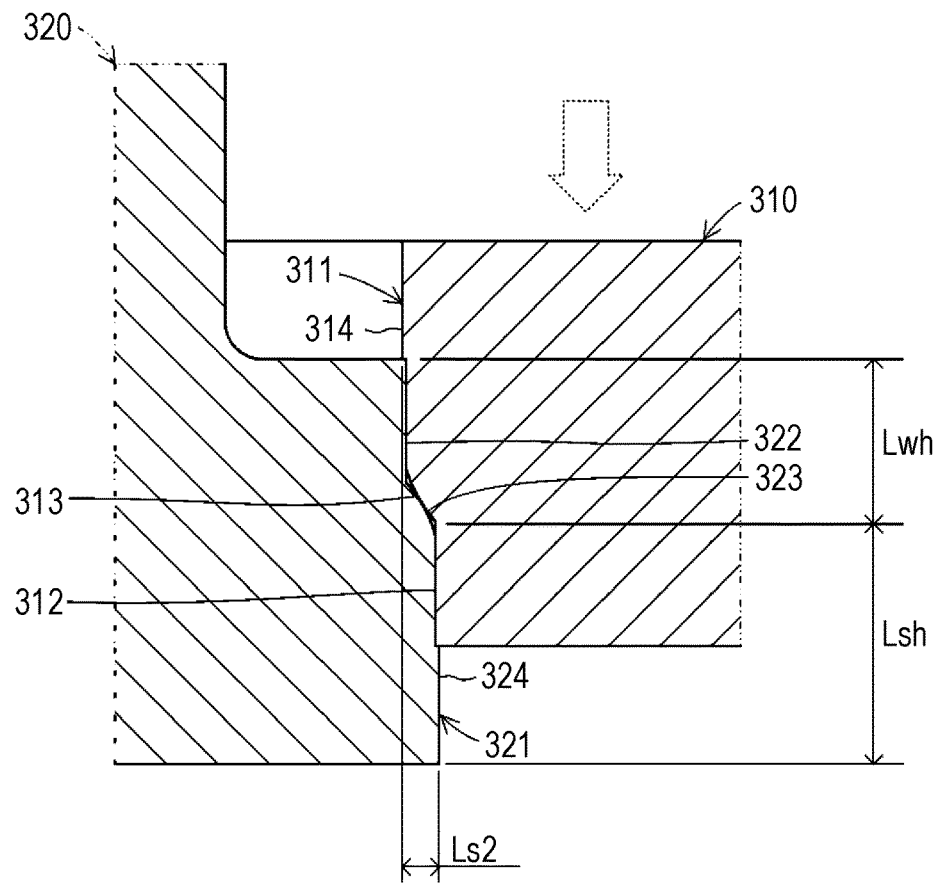
FIG. 10 is a schematic sectional view of a main portion for describing a main portion configuration in a state right after a second weak press-fit step as one step of the joint component manufacturing method according to the second embodiment of the present invention.

Then, a worker press-fits, as a third step, the hole-side weak press-fit portion 312 of the first member 310 and the shaft-side strong press-fit portion 324 of the second member 320 to each other. At the same time, the worker press-fits the hole-side strong press-fit portion 314 of the first member 310 and the shaft-side weak press-fit portion 322 of the second member 320 to each other. Specifically, the worker operates a processing machine 200 to move (move downward in a direction indicated by a dashed arrow in FIG. 9) a first die 201 toward the second die 202 in a non-current-application state. Accordingly, as illustrated in FIG. 10, the hole-side weak press-fit portion 312 of the hole 311 of the first member 310 is fitted in the shaft-side strong press-fit portion 324 of the shaft portion 321 of the second member 320. At the same time, the shaft-side weak press-fit portion 322 of the shaft portion of the second member 320 is fitted in the hole-side strong press-fit portion 314 of the hole 311 of the first member 310. In this case, the first member 310 and the second member 320 are configured such that the second weak press-fit interference Lw2 is set to such a thickness that no burrs are generated between these members, and therefore, are fitted to each other with no burrs between both members.

At the third step, the first die 201 and the second die 202 each press the first member 310 and the second member 320 with these members being displaceable in the radial direction. Thus, in a case where the positions of the center axes of the hole-side weak press-fit portion 312 and the shaft-side strong press-fit portion 324 are shifted from each other upon fitting therebetween and the positions of the center axes of the shaft-side weak press-fit portion 322 and the hole-side strong press-fit portion 314 are shifted from each other upon fitting therebetween, at least one of the first member 310 or the second member 320 is displaced in the radial direction such that the positions of the center axes of these members are coincident with each other. In this manner, the first member 310 and the second member 320 are fitted to each other with the center axes being coincident with each other. The third step corresponds to a second weak press-fit step according to the present invention. That is, each of the hole-side weak press-fit portion 312 and the shaft-side weak press-fit portion 322 corresponds to a weak press-fit portion according to the present invention. Each of the hole-side strong press-fit portion 314 and the shaft-side strong press-fit portion 324 corresponds to a strong press-fit portion according to the present invention.

Figure 11:
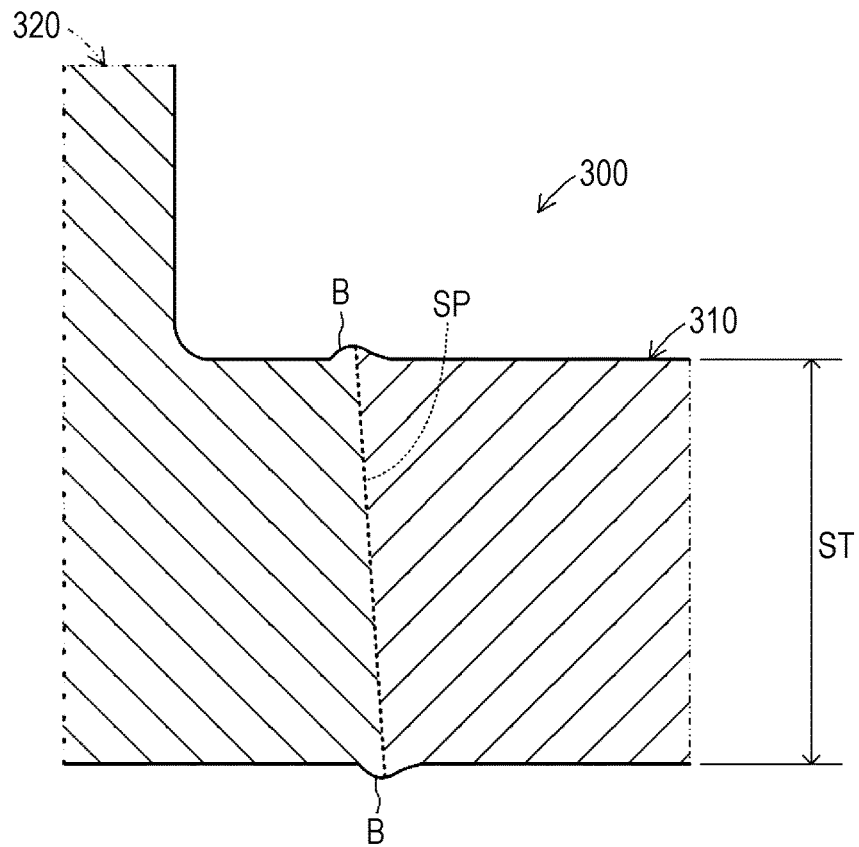
FIG. 11 is a schematic sectional view of a main portion for describing a main portion configuration in a state right after a second strong press-fit step as one step of the joint component manufacturing method according to the second embodiment of the present invention.

Next, the worker press-fits, as a fourth step, the hole-side strong press-fit portion 314 of the first member 310 and the shaft-side strong press-fit portion 324 of the second member 320 to each other. Specifically, the worker operates the processing machine 200 to move (move downward in a direction indicated by a dashed arrow in FIG. 10) the first die 201 toward the second die 202 in a current application state between the first die 201 and the second die 202. Thus, as illustrated in FIG. 11, the hole-side strong press-fit portion 314 of the hole 311 of the first member 310 is fitted in the shaft-side strong press-fit portion 324 through the gradually-changing portion 323 of the shaft portion 321 of the second member 320. Then, solid phase bonding between the hole-side strong press-fit portion 314 and the shaft-side strong press-fit portion 324 is made by resistance heat by applying a current and pressure due to lowering of the first die 201.

In this case, burrs B due to solid phase bonding between the hole-side strong press-fit portion 314 and the shaft-side strong press-fit portion 324 might be generated at both end portions of a bonding portion SP between the hole 311 and the shaft portion 321. That is, the burrs B are or are not generated according to the formation length Lwh of each of the hole-side weak press-fit portion 312 and the shaft-side weak press-fit portion 322.

At the bonding portion SP, a press-fit portion between the hole-side weak press-fit portion 312 and the shaft-side strong press-fit portion 324 and a press-fit portion between the shaft-side weak press-fit portion 322 and the hole-side strong press-fit portion 314 are each bonding portions formed by press-fit bonding and/or solid phase bonding. A press-fit portion between the hole-side strong press-fit portion 314 and the shaft-side strong press-fit portion 324 is a bonding portion by solid phase bonding. In this case, the press-fit portion between the hole-side weak press-fit portion 312 and the shaft-side strong press-fit portion 324 and the press-fit portion between the shaft-side weak press-fit portion 322 and the hole-side strong press-fit portion 314 includes, according to the materials, shapes, press-fit conditions, and current application conditions of the first member 310 and the second member 320, the case of bonding only by press-fitting, the case of bonding only by solid phase bonding, and the case of bonding by a combination of press-fit bonding and solid phase bonding.

Thus, according to the joint component manufacturing method of the present invention, the formation length Lwh of each of the hole-side weak press-fit portion 312 and the shaft-side weak press-fit portion 322 and the formation length Lsh of each of the hole-side strong press-fit portion 314 and the shaft-side strong press-fit portion 324 are adjusted as necessary so that the amount of generated burrs B and bonding strength between both members can be adjusted.

By the fourth step, the first member 310 and the second member 320 are bonded to each other to form the joint component 300. The fourth step corresponds to a second strong press-fit step according to the present invention. That is, each of the hole-side strong press-fit portion 314 and the shaft-side strong press-fit portion 324 corresponds to a strong press-fit portion according to the present invention.

Note that the bonding portion SP does not clearly appear, and FIG. 11 merely illustrates trend. Moreover, in the second embodiment, the worker instructs the processing machine 200 to execute each of the third and fourth steps. However, the processing machine 200 can be configured to continuously execute the third step and the fourth step by a single instruction. Thereafter, the worker takes, as a fifth step, the joint component 300 out of the processing machine 200.

As seen from operation description above, in the joint component manufacturing method, the hole 311 of the first member 310 and the shaft portion 321 of the second member 320 are, according to the second embodiment, bonded to each other by press-fitting with the second strong press-fit interference Ls2 through press-fitting with the second weak press-fit interference Lw2. In the this case, the second weak press-fit interference Lw2 is, with respect to the second strong press-fit interference Ls2, formed such that an overlapping thickness (i.e., the press-fit interference) between both members is decreased. Thus, according to the joint component manufacturing method according to the present invention, occurrence of burrs in bonding between the first member 310 having the hole 311 and the second member 320 having the shaft portion 321 is reduced while close contact between both members without any clearances and firm bonding between both members can be realized.

Further, implementation of the present invention is not limited to each of the above-described embodiments, and various changes can be made without departing from the object of the present invention. Note that the same reference numerals are used to represent the same components as those of each of the above-described embodiments in the figures referred in description of variations below, and description thereof will be omitted as necessary.

Figure 12:
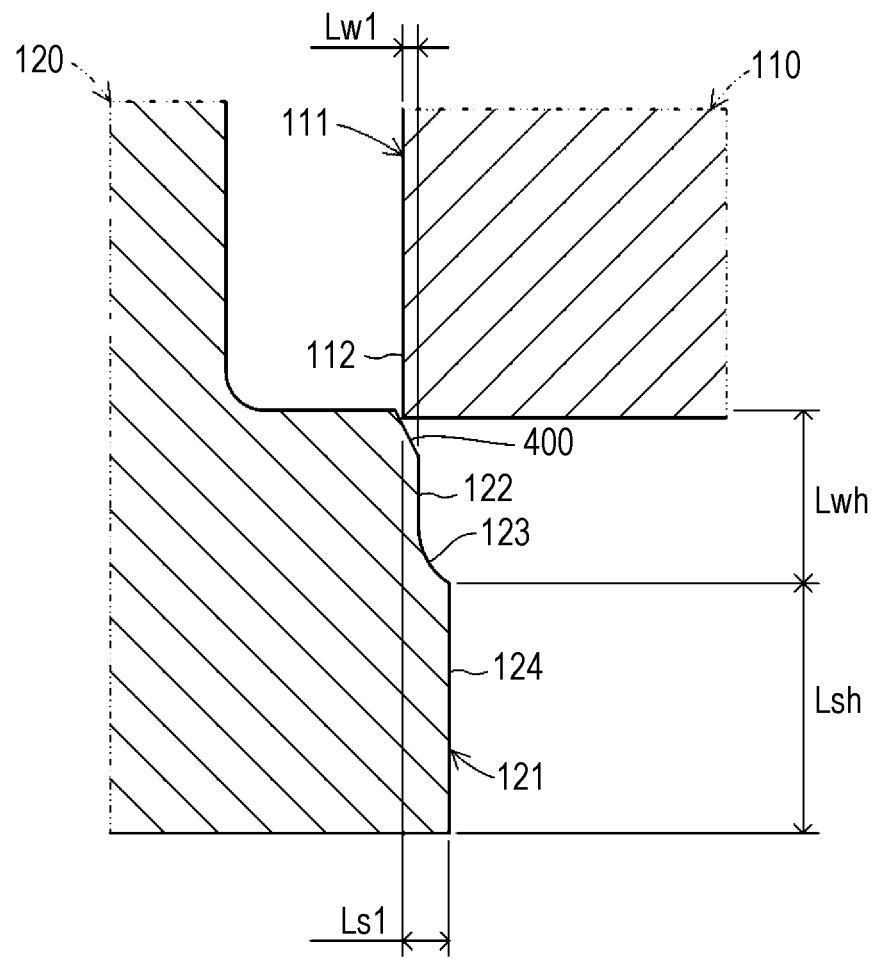
FIG. 12 is a schematic sectional view of a main portion for describing a main portion configuration in a state in which a first member is arranged on a second member at one step of a joint component manufacturing method according to a variation of the present invention.

For example, in each of the above-described embodiments, a corner portion of a tip end portion (an opening) on an insertion side of the shaft portion 121, 321 at the hole 111, 311 of the first member 110, 310 and a corner portion of a tip end portion on an insertion side of the hole 111, 311 at the shaft portion 121, 321 of the second member 120, 320 are formed at right angle. However, a guide portion 400 having an inclined surface or a curved surface can be provided at at least one of the corner portion of the tip end portion (the opening) of the hole 111, 311 or the corner portion of the tip end portion of the shaft portion 121, 321. For example, as illustrated in FIG. 12, the guide portion 400 can be provided in an inclined surface shape at a corner portion of a tip end portion of the shaft portion 121 on a side to be first fitted. In this case, the guide portion 400 is formed such that the outer diameter of the shaft portion 121 increases from the tip end portion of the shaft portion 121 to a far side (the downward direction as viewed in FIG. 12) in the axial direction.

Figure 13:
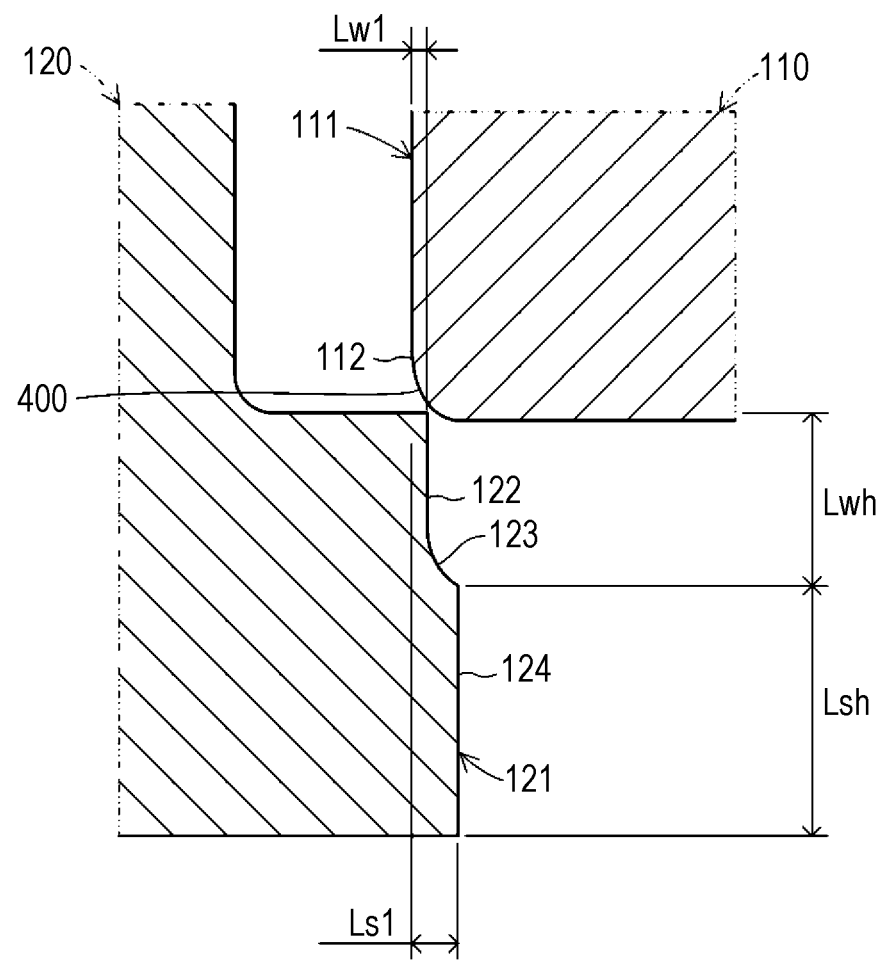
FIG. 13 is a schematic sectional view of a main portion for describing a main portion configuration in a state in which a first member is arranged on a second member at one step of a joint component manufacturing method according to another variation of the present invention.

Alternatively, the guide portion 400 can be, for example, provided in a curved shape at a corner portion of a tip end portion of the hole 111 on a side to be first fitted, as illustrated in FIG. 13. In this case, the guide portion 400 is formed such that the inner diameter of the hole 111 decreases from the tip end portion (an opening) of the hole ill to the far side (the upward direction as viewed in FIG. 13) in the axial direction. In these cases, it is further effective that the length of the guide portion 400 in the axial direction is formed longer than those of the hole 111, 311 and the shaft portion 121, 321 in the radial direction. With this configuration, the shaft portion 121, 321 of the second member 120, 320 is smoothly guided into the hole 111, 311 of the first member 110, 310, and therefore, is easily fitted in the hole 111, 311. Thus, occurrence of burrs can be more effectively reduced.

In other words, this means that the first weak press-fit interference Lw1 and the second weak press-fit interference Lw2 can be increased. According to the experiment by the present inventor et al., it has been confirmed that the guide portion 400 is provided at the corner portion of the tip end portion (the opening) of the hole 111 and occurrence of burrs can be accordingly avoided even in a case where the first weak press-fit interference Lw1 and the second weak press-fit interference Lw2 have a diameter of greater than 0 mm and equal to or less than 0.2 mm when the diameter of each of the hole 111 and the shaft portion 121 formed of the steel members is within a range of 10 mm to 100 mm in terms of diameter.

Moreover, in each of the above-described embodiments, the gradually-changing portions 123, 313, 323 are provided at the first member 310 and the second member 120, 320. However, the first member 310 and the second member 120, 320 can be configured such that the gradually-changing portions 123, 313, 323 are omitted. In this case, at the first member 310 and the second member 120, 320, the hole-side weak press-fit portion 312 and the hole-side strong press-fit portion 314 are in a shape of which inner or outer diameter promptly changes in a stepwise manner, and the shaft-side weak press-fit portion 122, 322 and the shaft-side strong press-fit portion 124, 324 are in a shape of which inner or outer diameter promptly changes in a stepwise manner.

Further, in each of the above-described embodiments, the first member 110, 310 and the second member 120, 320 are made of the same material. However, the first member 110, 310 and the second member 120, 320 can be made of different materials. In this case, at the first member 110, 310 and the second member 120, 320, a member (e.g., a shape having a relatively-small thickness) more-deformable shape at the first weak press-fit step and the second weak press-fit step is made of a material having lower hardness than that of a member (e.g., a shape having a relatively-great thickness) in a less-deformable shape. Thus, occurrence of the burrs B at the first weak press-fit step and the second weak press-fit step can be more effectively reduced.

In addition, in each of the above-described embodiments, the first die 201 and the second die 202 each press or support the first member 110, 310 and the second member 120, 320 in a deformable state in the direction perpendicular to the fitting direction. However, the first die 201 and the second die 202 can also each press or support the first member 110, 310 and the second member 120, 320 in a state in which displacement in the direction perpendicular to the fitting direction is restricted, i.e., a state in which the first member 110, 310 and the second member 120, 320 are held.

Moreover, in each of the above-described embodiments, the processing machine 200 is configured such that the first die 201 moves toward or away from the second die 202. However, the processing machine 200 can be configured such that the second die 202 moves toward or away from the first die 201. Alternatively, the processing machine 200 can be configured such that the tops and bottoms of the first die 201 and the second die 202 are inverted. That is, in the joint component manufacturing method, the first member 110, 310 may be displaced with respect to the second member 120, 320, or the second member 120, 320 may be displaced with respect to the first member 110, 310. Displacement of both members is relative displacement.

LIST OF REFERENCE NUMERALS

Lw1 first weak press-fit interference
Ls1 first strong press-fit interference
Lw2 second weak press-fit interference
Ls2 second strong press-fit interference
Lwh formation length of weak press-fit portion
Lsh formation length of strong press-fit portion
ST bonding thickness
SP bonding portion
B burr
100, 300 joint component
110, 310 first member
111, 311 hole
112, 312 hole-side weak press-fit portion
313 gradually-changing portion
314 hole-side strong press-fit portion
120, 320 second member
121, 321 shaft portion
122, 322 shaft-side weak press-fit portion
123, 323 gradually-changing portion
124, 324 shaft-side strong press-fit portion
200 processing machine
201 first die
202 second die
400 guide portion

The invention claimed is:

1. A joint component manufacturing method for joining a first member and a second member by fitting of a shaft portion of the second member in a hole of the first member, the first member and the second member each including a weak press-fit portion at a tip end portion and a strong press-fit portion formed to protrude to a far side of the tip end portion, the tip end portion of the first member and the tip end portion of the second member first fitted to each other upon fitting between the hole and the shaft portion, the weak press-fit portion of the first member and the weak press-fit portion of the second member not contacting each other at the tip end portions, the method comprising:
 a second weak press-fit step of press-fitting the weak press-fit portion of the first member and the strong press-fit portion of the second member and press-fitting the weak press-fit portion of the second member and the strong press-fit portion of the first member; and a second strong press-fit step of press-fitting the strong press-fit portion of the first member and the strong press-fit portion of the second member to each other in a state in which electric resistance heat is generated between the first member and the second member by applying a current, wherein a second weak press-fit interference, which is a thickness of an overlapping portion upon fitting between the weak press-fit portion of the first member and the strong press-fit portion of the second member and upon fitting between the weak press-fit portion of the second member and the strong press-fit portion of the first member, is thinner than a second strong press-fit interference, which is a thickness of an overlapping portion upon fitting between the strong press-fit portion of the first member and the strong press-fit portion of the second member.

2. The joint component manufacturing method according to claim 1, wherein the second weak press-fit interference is formed to such an overlapping thickness that no burr is generated between the first member and the second member fitted to each other.

3. The joint component manufacturing method according to claim 1, wherein a guide portion having an inclined surface or a curved surface is formed at at least one corner portion of the tip end portions first fitted to each other upon fitting between the hole and the shaft portion.

4. The joint component manufacturing method according to claim 1, wherein each of the weak press-fit portion of the first member and the weak press-fit portion of the second member has a gradually-changing portion of which the shape gradually changes with respect to the strong press-fit portion, the first member comprises the weak press-fit portion, the gradually-changing portion and the strong press-fit portion in this order, and the second member comprises the weak press-fit portion, the gradually-changing portion and the strong press-fit portion in this order.

5. The joint component manufacturing method according to claim 1, wherein at the second weak press-fit step, at least one of the first member and the second member is supported in a displaceable state in a direction perpendicular to a fitting direction.

6. The joint component manufacturing method according to claim 1, wherein each of a formation length of the weak press-fit portion of the first member in a press-fit direction and a formation length of the weak press-fit portion of the second member in the press-fit direction is equal to or less than a half of each of a formation length of the strong press-fit portion of the first member in the press-fit direction and a formation length of the strong press-fit portion of the second member in the press-fit direction.

7. The joint component manufacturing method according to claim 4, wherein each of a formation length of the weak press-fit portion of the first member in a press-fit direction and a formation length of the weak press-fit portion of the second member in the press-fit direction is equal to or less than a half of each of a formation length of the strong press-fit portion of the first member in the press-fit direction and a formation length of the strong press-fit portion of the second member in the press-fit direction.

8. The joint component manufacturing method according to claim 1, wherein each of a formation length of the weak press-fit portion of the first member in a press-fit direction and a formation length of the weak press-fit portion of the second member in the press-fit direction is equal to or greater than $1/5$ of a thickness of a bonding portion between the hole of the first member and the shaft portion of the second member.

* * * * *